United States Patent [19]

Smith

[11] 4,280,048
[45] Jul. 21, 1981

[54] NEUTRON ACTIVATION PROBE

[75] Inventor: Richard C. Smith, Pittsburgh, Pa.

[73] Assignee: Wyoming Mineral Corporation, Lakewood, Colo.

[21] Appl. No.: 46,734

[22] Filed: Jun. 7, 1979

Related U.S. Application Data

[63] Continuation of Ser. No. 873,343, Jan. 30, 1978.

[51] Int. Cl.³ .................. G01V 5/00; G21G 4/02
[52] U.S. Cl. .................. 250/264; 250/265; 250/269; 250/502
[58] Field of Search ............... 250/270, 265, 264, 269, 250/266, 501, 502; 328/65

[56] References Cited

U.S. PATENT DOCUMENTS

| Re. 26,027 | 5/1966 | Manteuffel | 328/65 |
|---|---|---|---|
| 2,284,345 | 5/1942 | Schlesman | 250/264 |
| 2,933,611 | 4/1960 | Foster | 250/502 |
| 3,296,551 | 1/1967 | Staples | 328/65 |
| 3,461,291 | 8/1969 | Goodman | 250/262 |
| 3,487,211 | 12/1969 | Youmans | 250/269 |
| 3,686,503 | 8/1972 | Givens et al. | 250/262 |
| 3,828,189 | 8/1974 | Givens | 250/264 |
| 4,122,340 | 10/1978 | Smith et al. | 250/264 |
| 4,180,728 | 12/1979 | Goldstein | 250/264 |

Primary Examiner—Alfred E. Smith
Assistant Examiner—Carolyn E. Fields
Attorney, Agent, or Firm—L. A. DePaul; Z. L. Dermer

[57] ABSTRACT

A neutron activation probe comprises a pulsed neutron source in series with a plurality of delayed neutron detectors for measuring radioactivity in a well borehole. The neutron source emits neutrons which produce fission in uranium in the ore body and the delayed neutron detectors measure the delayed neutrons produced from such fission while the probe is moved through the borehole. The signal from each neutron detector is delayed in time so that the activity measured by each neutron detector from a particular ore zone may be added thereby increasing the accuracy of the reading corresponding to that ore zone.

1 Claim, 1 Drawing Figure

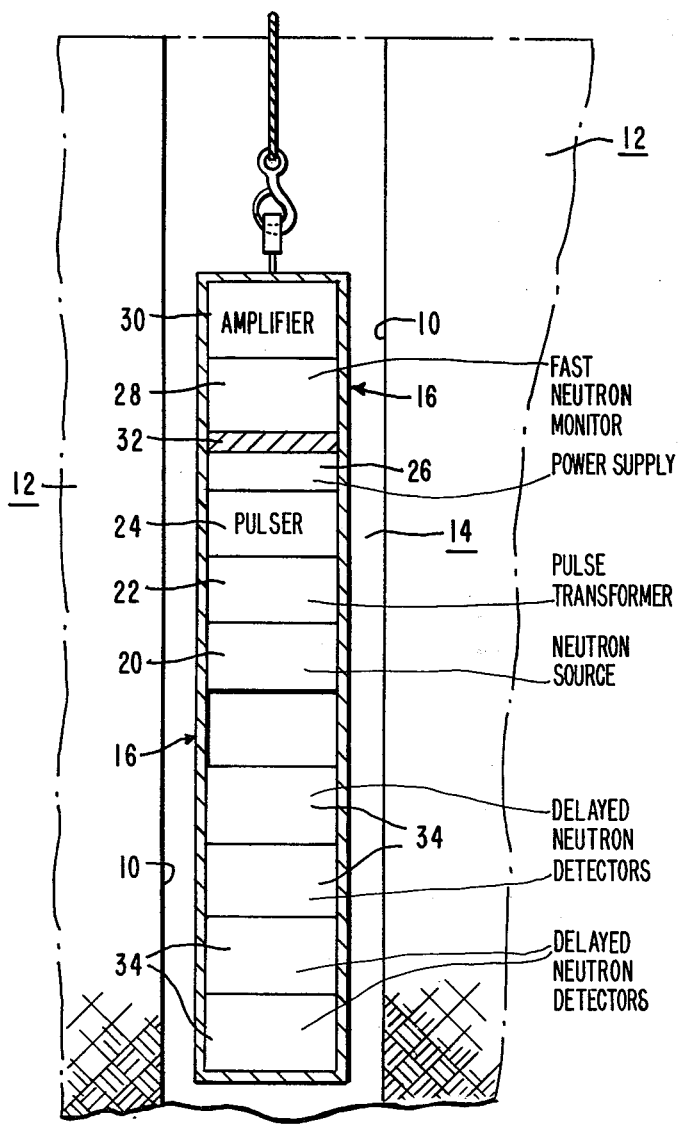

NEUTRON ACTIVATION PROBE

This is a continuation of application Ser. No. 873,343, filed Jan. 30, 1978.

BACKGROUND OF THE INVENTION

This invention relates to radiation detectors and particularly to neutron radiation detectors for measuring the presence of uranium in ore bodies.

In the exploration and mining of uranium from naturally occurring ore bodies, it is necessary to determine the location and quantity of the ore in order to determine if mining the particular ore body is economically feasible. There are many methods known in the art for measuring ore bodies, one of which is well logging in which boreholes are drilled in the ore body and electronic instruments are moved through the borehole. The electronic instruments detect radiation from the ore body which gives an indication of the amount of radioactive material present in the ore body. However, unlike uranium, not all radioactive material is of a fissionable nature and, therefore, not desirable to mine. For example, radium which is a daughter product of uranium is radioactive but is not fissionable. Furthermore, while radium and uranium are often found together, geological or natural chemical processes may separate them so that a radiation indication may result from the presence of radium and not be an indication of the presence of uranium. Therefore, it is important to be able to determine the location of fissionable isotopes such as uranium by utilizing mechanisms that can distinguish between the radiation produced by fissionable isotopes and the radiation produced by non-fissionable isotopes.

In U.S. Pat. No. 3,686,503, entitled "In-Situ Assaying For Uranium In Rock Formations", issued Aug. 22, 1972 by W. W. Givens et al. there is described a method for quantitatively measuring uranium ore grade. The method employs a tool containing a source of neutrons and a neutron detector that is placed in a borehole at the level of a formation of interest. The source is operated cyclically to irradiate a zone in the formation with neutrons. Neutrons resulting from the irradiation of the zone in the formation are detected and recorded to obtain a record of delayed neutrons emitted as a result of neutron fission of uranium. Recording takes place within each cycle beginning at a time period after the source neutrons have died away via absorption in the formation. Recording the number of neutrons emitted as a result of the fission process gives an indication of the quantity of uranium present in the formation.

While there exist methods of measuring delayed neutrons to give an indication of the uranium content of the ore body, these methods can suffer from inefficient use of the neutron source by not detecting a large fraction of the radioactivity induced by neutrons because the delayed neutron detectors only span a short length of activated zone while those of longer lengths do not provide good spatial resolution. Therefore, a neutron activation probe is needed that is capable of accurately measuring delayed neutrons while making efficient use of the neutron source to assay uranium ore and yet relating the results to a specific location in the formation.

SUMMARY OF THE INVENTION

A neutron activation probe comprises a neutron source in series with a fast neutron monitor and a plurality of delayed neutron detectors for measuring radioactivity in a well borehole as the probe is moved through the borehole. The neutron source emits pulses of fast neutrons which become thermal neutrons and produce fission in uranium in the ore body while the fast neutron monitor detects the fast neutrons generated by the neutron source in order to monitor the performance of the neutron source. Signals from the plurality of delayed neutron detectors are registered during the time between pulses of the neutron source so as to detect the delayed neutrons resulting from fission of the fissionable isotopes produced by the fast neutrons without detecting the fast neutrons. The signal from each delayed neutron detector is delayed in time so that the radioactivity measured by each delayed neutron detector, as that detector passes a particular ore zone, may be added thereby increasing the number of delayed neutrons detected from a particular ore zone thus increasing the accuracy of the reading corresponding to that ore zone.

BRIEF DESCRIPTION OF THE DRAWING

While the specification concludes with claims particularly pointing out and distinctly claiming the subject matter of the invention, it is believed the invention will be better understood from the following description taken in conjunction with the accompanying single FIGURE of drawing wherein the FIGURE is a cross-sectional view in elevation of the neutron activation probe and diagram of the recording system.

DESCRIPTION OF THE PREFERRED EMBODIMENT

In exploration for uranium and in in-situ solution mining of uranium, it is important to be able to determine the location and grade of the uranium within the ore body so as to avoid costly excessive drilling. Where the uranium ore may be of a low grade, the radioactivity associated with the uranium alone may be difficult to detect and specifically locate. The invention described herein provides a probe for detecting low grade uranium deposits with improved spatial resolution.

Referring to the FIGURE, a borehole 10 is drilled by conventional methods into the ore body 12. The neutron activation probe 14 which may have a stainless steel casing 16 is suspended within borehole 10 by cable 18. A fast neutron source 20 which may be a sealed-tube accelerator that produces 14.3 MeV neutrons by a deuterium-tritium reaction is disposed in casing 16 for producing fast neutrons some of which cause a portion of the $^{238}U$ located in ore body 12 to fission and others of which are eventually slowed and cause a portion of the $^{235}U$ located in ore body 12 to fission. A high voltage pulse transformer 22, a pulser 24 such as a spark-gap switched capacitor discharge circuit, and a power supply 26 which may be a 5 KV D.C. source connected to an above-ground A.C. supply through cable 18 are located in casing 16 for causing neutron source 20 to generate fast neutrons in regular pulses as commanded by the above-ground instrumentation. In this arrangement, high voltage pulse transformer 22 may be connected to power supply 26 for increasing the voltage from power supply 26. Also, pulser 24 may be connected to high voltage pulse transformer 22 and to neutron source 20 for providing a high voltage pulse to neutron source 20. Apparatus for producing such regular neutron pulses is also described in U.S. Pat. No. 3,686,503 by W. W. Givens et al. and entitled "In-Situ Assaying for Uranium Rock Formations." Neutron source 20 may be set to pulse at intervals such as 0.50 seconds, while the duration of the pulse of the neutron source 20 may be approximately 6 microseconds.

A fast neutron monitor 28 such as a scintillation detector that is relatively insensitive to gamma radiation and that may be chosen from those well known in the art such as the NE-451 manufactured by Nuclear Enterprises, Inc. in combination with a phototube may be disposed in casing 16 above neutron source 20. Amplifier mechanism 30 which includes a DC power source and a plurality of amplifiers is also disposed in casing 16 and electrically connected to fast neutron monitor 28 for controlling fast neutron monitor 28 and for transmitting electrical signals to above-ground instrumentation. Fast neutron monitor 28 serves to detect the amount of fast neutrons near probe 14 so as to be able to monitor the output of neutron source 20. Any change in the amount of fast neutrons produced by neutron source 20 can be detected by fast neutron monitor 28. In addition, an X-ray shield 32 which may be a lead disc is disposed between neutron source 20 and fast neutron monitor 28 so as to shield fast neutron monitor 28 from X-rays produced by neutron source 20 thereby increasing the reliability of the fast neutron monitor 28.

A plurality of delayed neutron detectors 34 which may be helium-3 filled gas proportional counters such as type 253 manufactured by LND, Inc. of Oceanside, N.Y. are arranged colinearly in casing 16 and below fast neutron generator 20. Each delayed neutron detector 34 is connected to a separate amplifier in amplifier mechanism 30 that amplifies the signals from the delayed neutron detector 34. Delayed neutron detectors 34 serve to detect the amount of delayed neutrons produced by the fission of fissionable isotopes in ore body 12 that has been caused by neutron source 20. Since the amount of delayed neutrons detected by the delayed neutron detector 34 is a linear function of the amount of fissionable isotopes present in the ore body such as uranium, it is possible to approximate the grade of the uranium ore in the ore body by determining the amount of delayed neutrons detected by delayed neutron detectors 34. Delayed neutron detectors 34 are electrically connected to above-ground instrumentation that not only controls the pulses of the neutron source 20 but also controls the gating of the signals from the delayed neutron detectors 34 so that the signals from delayed neutron detectors 34 are ignored during the pulses of neutron source 20 and accepted for processing between pulses of neutron source 20. In this manner, signals accepted from the delayed neutron detectors 34 will not be affected by the fast neutrons generated by neutron source 20. This is possible because neutron source 20 will only be pulsed at intervals of 0.50 secs while the duration of the neutron source pulse is on the order of 6 microsec and the lifetime of both the neutrons from neutron source 20 and any induced prompt fission neutrons is on the order of 1 msec. Therefore, the signals from the delayed neutron detectors 34 need only be ignored for approximately 10 msec of the 0.50 sec interval between pulses of neutron source 20. Thus, the signals from the delayed neutron detectors 34 have sufficient time to represent the delayed neutron intensity without interference from the neutrons from neutron source 20.

Cable 18 which supports probe 14 is attached to drive mechanism 36 which may be a motor and spool arrangement for winding and unwinding cable 18 so that probe 14 can be raised or lowered through borehole 10. Drive mechanism 36 may also comprise a mechanism for recording the length of cable 18 that has been wound or unwound such as a rotary encoder chosen from those well known in the art. By thus recording the length of the cable 18, the depth of probe 14 within borehole 10 may be determined and the readings of the detectors of probe 14 may be compared with such a depth reading to thereby correlate the two readings. In this manner, the determination made as to the mineralization can be associated with the appropriate location of the mineralization in the ore body.

The instrumentation within probe 14 such as delayed neutron detectors 34 are electrically connected to above ground instrumentation through cable 18. The above ground instrumentation may include an electronics control and signal processing unit 38 which is connected to power supply 26 for causing neutron source 20 to produce regular pulses, to fast neutron monitor 28 for processing the signals therefrom, and to delayed neutron detectors 34 for gating the signals therefrom on or off and for processing the signals. A minicomputer 40 such as a TI-93013 manufactured by the Texas Instrument Corp. may also be employed to process the signals from the several delayed neutron detectors 34. The processed signals from delayed neutron detectors 34 may be displaced on a paper chart recorder 42 and the output may be recorded on magnetic tape recorder 44.

An important feature of probe 14 is that delayed neutron detectors 34 are a plurality of short thermal neutron detectors. Each of such delayed neutron detector could be approximately 8 inches in length with several of them aligned colinearly within casing 16. In addition, the output signal of each delayed neutron detector 34 is retarded in time by an amount $(l/v)$ with respect to the delayed neutron detector immediately following it (where $l$ is the distance a detector would have to move for its position to coincide exactly with that of the preceding detector and $v$ is the speed of probe 14 through borehole 10). Accordingly, if there are three delayed neutron detectors 34, the signals from the first one entering a zone to be assayed would be delayed by an amount $(2\ l/v)$, the signals from the second would be delayed by an amount $(l/v)$, and the signals from the last one would not be delayed at all. This can be accomplished by the above-ground instrumentation such as minicomputer 40. Also, minicomputer 40 can then add these delayed signals with the so added signals displayed by paper chart recorder 42. By so adding the delayed signals, a higher count of delayed neutrons from a particular zone is obtainable thus increasing the statistical accuracy of the reading. Furthermore, the shortness of each delayed neutron detector enables probe 14 to obtain readings on smaller zones of the ore body which thereby improves the spatial resolution of the device. However, short individual delayed neutron detectors would ordinarily not detect a sufficient amount of delayed neutrons to be statistically accurate. This problem is, of course, eliminated by the use of several short delayed neutron detectors whose signals are delayed in time and then added to obtain a statistically significant reading over a smaller ore zone.

OPERATION

In operation, probe 14 is lowered through borehole 10 by cable 18 to the maximum desired depth. At this point the above ground instrumentation is activated along with the probe devices. Neutron source 20 then beings to emit fast neutrons which penetrate ore body 12 and cause the fissionable isotopes therein such as uranium to fission. The daughter products of uranium then emit delayed neutrons which are detected by delayed neutron detectors 34. At the same time, fast neutron monitor 28 monitors the output of neutron source 20. Delayed neutron detectors 34 are continuously activated, but their signals are gated off by electronics control and signal processing unit 38 so as to be registered only between pulses of neutron source 20 so that only the delayed neutrons are recorded. The signals of these devices are transmitted electrically through cable 18 to the above ground instrumentation where the signals are processed and recorded. As this is occurring probe 14 is moved upwardly through borehole 10 by cable 18 and drive mechanism 36. These readings are taken as probe 14 is moved upwardly rather than moved downwardly because probe 14's movement may be more accurately controlled by pulling it through borehole 10. However, these readings may also be obtained by reversing the probe and lowering it through the borehole. Each delayed neutron detector being relatively short detects delayed neutrons only from a relatively short ore zone. However, since probe 14 is being moved and since the signals from each delayed neutron detector are appropriately delayed in time, the total reading of probe 14 corresponding to a particular relatively short ore zone is more accurate. The above ground instrumentation, delays the recording of the delayed neutron detector signals so that the results of a particular ore zone can be added and displayed. As probe 14 continues up borehole 10, the entire ore body can be thus investigated. In addition, should fast neutron monitor 28 detect variations in the output of neutron source 20, the results obtained by delayed neutron detectors 34 can be accordingly adjusted. As an alternative, a californium-252 source may be used as a neutron source and operated in a source-jerk mode. Therefore, the invention provides a probe for detecting uranium mineralization with improved statistical accuracy and improved spatial resolution.

I claim as my invention:

1. A neutron activation probe for assaying the amount of fissionable isotopes in an ore body comprising:
   a casing;
   drive means located above ground and attached to said casing for moving said casing through a borehole in said ore body;
   a sealed-tube accelerator disposed in said casing and capable of producing pulses of 14.3 MeV neutrons by a deuterium-tritium reaction for fissioning said fissionable isotopes within said ore body and consequently emitting delayed neutrons;
   a plurality of helium-3 gas filled delayed neutron detectors arranged colinearly in said casing below said sealed-tube accelerator for detecting said delayed neutrons;
   a scintillation detector together with a phototube for detecting the amount of fast neutrons emitted by said sealed-tube accelerator;
   a direct current power source disposed in said casing and connected to an above ground alternating current power supply;
   a high voltage pulse transformer disposed in said casing and connected to said direct current power source for increasing the voltage from said direct current power source;
   a pulser connected to said high voltage pulse transformer and connected to said sealed-tube accelerator for providing a high voltage pulse to said sealed-tube accelerator for emitting neutrons;
   an amplifier mechanism disposed in said casing and connected to said scintillation detector and said phototube for transmitting signals to above ground instrumentation; and
   control means for controlling the pulsing of said sealed-tube accelerator, for registering the signals from said delayed neutron detectors between pulses of said sealed-tube accelerator and for delaying the signal of each of said delayed neutron detectors by an amount sufficient to correspond each of said signals with the same ore zone of said ore body and for adding each of said signals so delayed and recording the result of such addition thereby increasing the accuracy of the reading of said delayed neutrons resulting from each ore zone.

* * * * *